(12) United States Patent
Bartetzko et al.

(10) Patent No.: US 10,221,685 B2
(45) Date of Patent: Mar. 5, 2019

(54) METHODS AND SYSTEMS FOR MONITORING WELL INTEGRITY AND INCREASING THE LIFETIME OF A WELL IN A SUBTERRANEAN FORMATION

(71) Applicant: Baker Hughes Incorporated, Houston, TX (US)

(72) Inventors: Anne Bartetzko, Celle (DE); Joerg Lehr, Celle (DE); Helmuth Sarmiento Klapper, Hannover (DE); Marcus Davidson, Inverurie (GB); Elke Bozau, Clausthal-Zellerfeld (DE)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 15/586,637

(22) Filed: May 4, 2017

(65) Prior Publication Data

US 2017/0234127 A1    Aug. 17, 2017

Related U.S. Application Data

(63) Continuation of application No. 14/295,992, filed on Jun. 4, 2014.
(Continued)

(51) Int. Cl.
*E21B 43/25* (2006.01)
*E21B 49/08* (2006.01)
(Continued)

(52) U.S. Cl.
CPC .............. *E21B 49/08* (2013.01); *C09K 8/032* (2013.01); *C09K 8/035* (2013.01); *C09K 8/528* (2013.01);
(Continued)

(58) Field of Classification Search
CPC ......... E21B 49/08; C09K 8/032; C09K 8/035; C09K 8/528; C09K 8/60; C09K 8/605
(Continued)

(56) References Cited

U.S. PATENT DOCUMENTS 3,558,487 A    1/1971   Sratton
3,920,560 A *  11/1975  McCoy .................... C09K 8/22
                                                          507/135
(Continued)

OTHER PUBLICATIONS

Bozau et al., Hydrogeochemical Modeling of Deep Formation Water Applied to Geothermal Energy Production, Procedia Earth and Planetary Science, vol. 7, (2013), pp. 97-100.
(Continued)

*Primary Examiner* — Silvana C Runyan
(74) *Attorney, Agent, or Firm* — TraskBritt

(57) ABSTRACT

A system for increasing the detecting degradation of a wellbore. The system comprises a computer memory configured for storing computing instructions and a processor operably coupled to the computer memory. The system comprises a sensor operably coupled to the computer memory and is configured to determine the presence of at least one chemical species indicative of degradation of the wellbore in a fluid exiting the wellbore. Methods of monitoring a wellbore for corrosion or other degradation of one or more components of wellbore equipment are disclosed as are methods of increasing the lifetime of a wellbore.

20 Claims, 8 Drawing Sheets

Related U.S. Application Data

(60) Provisional application No. 61/927,735, filed on Jan. 15, 2014.

(51) Int. Cl.

| | | |
|---|---|---|
| *E21B 49/00* | (2006.01) | |
| *C09K 8/03* | (2006.01) | |
| *C09K 8/035* | (2006.01) | |
| *C09K 8/528* | (2006.01) | |
| *C09K 8/60* | (2006.01) | |
| *E21B 21/00* | (2006.01) | |
| *E21B 41/02* | (2006.01) | |
| *E21B 47/00* | (2012.01) | |
| *E21B 49/02* | (2006.01) | |

(52) U.S. Cl.
CPC ............... *C09K 8/60* (2013.01); *C09K 8/605* (2013.01); *E21B 21/00* (2013.01); *E21B 41/02* (2013.01); *E21B 43/25* (2013.01); *E21B 47/00* (2013.01); *E21B 49/00* (2013.01); *C09K 2208/32* (2013.01); *E21B 49/02* (2013.01); *E21B 49/081* (2013.01); *E21B 2049/085* (2013.01)

(58) Field of Classification Search
USPC ..................................................... 166/250.05
See application file for complete search history.

(56) References Cited

U.S. PATENT DOCUMENTS

| | | | |
|---|---|---|---|
| 5,533,572 A | 7/1996 | Brady et al. | |
| 5,579,354 A | 11/1996 | Sakai et al. | |
| 5,627,749 A | 5/1997 | Waterman et al. | |
| 6,302,205 B1 | 10/2001 | Ryll | |
| 7,093,674 B2 | 8/2006 | Paluch et al. | |
| 7,637,151 B2 | 12/2009 | Raghuraman et al. | |
| 7,711,486 B2 | 5/2010 | Thigpen et al. | |
| 8,215,164 B1 | 7/2012 | Hussain et al. | |
| 8,322,414 B2 | 12/2012 | Al-Gouhi et al. | |
| 8,515,880 B2 | 8/2013 | Holley et al. | |
| 8,960,294 B2 * | 2/2015 | Freese ............ | C09K 8/62 166/250.01 |
| 2002/0179301 A1 | 12/2002 | Schultz et al. | |
| 2007/0074872 A1 | 4/2007 | Du et al. | |
| 2008/0262736 A1 | 10/2008 | Thigpen et al. | |
| 2010/0042327 A1 | 2/2010 | Garvey et al. | |
| 2010/0185401 A1 | 7/2010 | Hernandez et al. | |
| 2012/0007617 A1 | 1/2012 | Fisseler et al. | |
| 2012/0109611 A1 | 5/2012 | Loizzo et al. | |
| 2012/0118654 A1 | 5/2012 | Alexander | |
| 2012/0160329 A1 | 6/2012 | MacKenzie et al. | |
| 2013/0008649 A1 | 1/2013 | Vestbostad et al. | |
| 2014/0212983 A1 * | 7/2014 | DiFoggio ............ | G01N 33/24 436/119 |
| 2014/0251922 A1 * | 9/2014 | McDaniel .......... | B01D 19/0005 210/718 |
| 2015/0198038 A1 | 7/2015 | Bartetzko et al. | |

OTHER PUBLICATIONS

Crow et al., Wellbore Integrity Analysis of a Natural CO2 Producer, Energy Procedia, vol. 1, (2009), pp. 3561-3569.

Elshahawi et al., Integration of Geochemical, Mud Gas an Downhole Fluid Analyses for the Assessment of Compositional Grading—Case Studies, Society of Petroleum Engineers, Paper SPE 109684 presented at the SPE Annual Technical Conference and Exhibition, Anaheim, California, Nov. 11-14, 2007, 2 pages.

International Preliminary Report on Patentability for International Application No. PCT/US2015/011627 dated Jul. 19, 2016, 9 pages.

International Search Report for International Application No. PCT/US2015/011627 dated Apr. 27, 2015, 3 pages.

International Written Opinion for International Application No. PCT/US2015/011627 dated Apr. 27, 2015, 8 pages.

* cited by examiner

METHODS AND SYSTEMS FOR MONITORING WELL INTEGRITY AND INCREASING THE LIFETIME OF A WELL IN A SUBTERRANEAN FORMATION

CROSS-REFERENCE TO RELATED APPLICATIONS

This application is a continuation of U.S. patent application Ser. No. 14/295,992, filed Jun. 4, 2014, which claims the benefit of U.S. Provisional Patent Application Ser. No. 61/927,735, filed Jan. 15, 2014, and entitled "METHODS AND SYSTEMS FOR MONITORING WELL INTEGRITY IN A SUBTERRANEAN FORMATION," the disclosure of each of which applications is hereby incorporated herein in its entirety by reference.

FIELD

Embodiments of the disclosure relate generally to methods and systems for monitoring a downhole environment for corrosion and degradation of downhole equipment and components during downhole operation such as drilling of a wellbore, formation stimulation, and production.

BACKGROUND

During the lifetime of a well, the equipment used to construct and produce from the well may interact with different types of fluids, such as drilling fluids, stimulation fluids, completion fluids, formation fluids, fluids injected into an adjacent well, etc. Depending on their chemical properties, these fluids, which may be characterized generally as "corrosive fluids," may react with some of the materials within the well and with each other, causing corrosion, scaling and/or other degradation of the equipment within the well. Casing, liner, and cement lining the annulus between casing or liner and the wellbore wall are conventionally employed to enhance the stability of the well during drilling operations and/or production operations.

During the drilling of a wellbore, the drilling fluid contacts materials within the borehole such as drilling equipment, and any construction material such as casing and liner strings which may be in place within the wellbore. The drilling fluid may also interact with the formation and the formation fluid. The drilling fluid may invade into the formation and remain in reservoir and non-reservoir sections of the formation, or may later be removed with formation fluids during production. During a later stimulation stage, the stimulation fluid may be in contact with casing and liner strings, stimulation equipment, any other equipment in the borehole, the formation, and formation fluids. The stimulation fluids may remain in the formation until at least a portion of the stimulation fluid is removed with the formation fluid during production. Fluids may be injected into the well or into an adjacent well and may pass through the formation and be produced at a production well. During the production stage, completion fluid, residual drilling fluid, residual stimulation fluid remaining in the formation, and injected fluids may interact with each other, and with exposed surfaces of the casing, liners, tubing, the formation, and the formation fluid. The formation fluid may interact with exposed surfaces of the casing, liners, tubing, and the formation as it travels to the surface. Although the downhole equipment may be in contact with such fluids for only short periods of time, such as during drilling or stimulation, considerable degradation of equipment may take place due to the contact and interaction with the fluids.

After construction of the well, the formation fluid, produced fluid, residual drilling fluid, and residual stimulation fluid may be in contact with the casing, liner, and other components for longer periods of time. Although production wells may be equipped with corrosion resistant materials, with time, and particularly when aggressive fluids are produced, the integrity of these materials and materials with limited corrosion resistance may be reduced, which may enable the corrosive fluids to contact the casing, liner, tubing or other well construction equipment.

In addition, exposing cement within a well to formation fluids, drilling fluids, completion fluids, injected fluids, stimulation fluids, and mixtures thereof may cause the cement to degrade and crack. As the cement cracks, outer surfaces of the metal casing contacting and supported by the cement may become exposed to produced fluids, formation fluids, drilling fluids, completion fluids, injected fluids, stimulation fluids, and mixtures thereof. The metal and cement may react with such fluids.

BRIEF SUMMARY

Embodiments disclosed herein include systems for monitoring the integrity of a well and methods of reducing degradation of at least one wellbore component. For example, in accordance with one embodiment, a method of monitoring degradation of a wellbore comprises predicting at least one reaction between at least one of a formation fluid, a drilling fluid, a stimulation fluid, a completion fluid, an injected fluid, a component of wellbore equipment, a formation, and another of the formation fluid, the drilling fluid, the stimulation fluid, the completion fluid, the injected fluid, the component of wellbore equipment, and the formation using at least one of thermodynamic equations and chemical reaction kinetics equations, identifying at least one property of a fluid exiting the wellbore, wherein the at least one property is indicative of the at least one reaction, and analyzing the fluid exiting the wellbore for changes in the at least one property.

In additional embodiments, a method of reducing degradation of a wellbore comprises determining a composition of at least one of a formation and a formation fluid within a wellbore, predicting at least one reaction between the formation fluid and at least one of wellbore equipment, the formation, a drilling fluid, a stimulation fluid, an injected fluid, and a completion fluid, identifying at least one chemical species in the fluid exiting the wellbore, wherein the at least one chemical species is indicative of the at least one predicted reaction, and adjusting a composition of the injected fluid into the wellbore responsive to detection of the at least one chemical species indicative of the at least one predicted reaction in the fluid exiting the wellbore.

In further embodiments, a system for detecting degradation of wellbore equipment within a wellbore comprises a computing system comprising a computer memory configured for storing computing instructions and a processor operably coupled to the computer memory and configured for retrieving the computing instructions from the computing memory and executing the computing instructions to predict a composition of a subsurface formation fluid and at least one reaction between the subsurface formation fluid and at least one of a drilling fluid, a stimulation fluid, a completion fluid, an injected fluid, and at least one component of wellbore equipment. The system further comprises a sensor operably coupled to the computing system, the sensor located and configured to detect at least one property of a produced fluid, wherein the at least one property is indicative of the at least one reaction.

DETAILED DESCRIPTION

Figure 1:
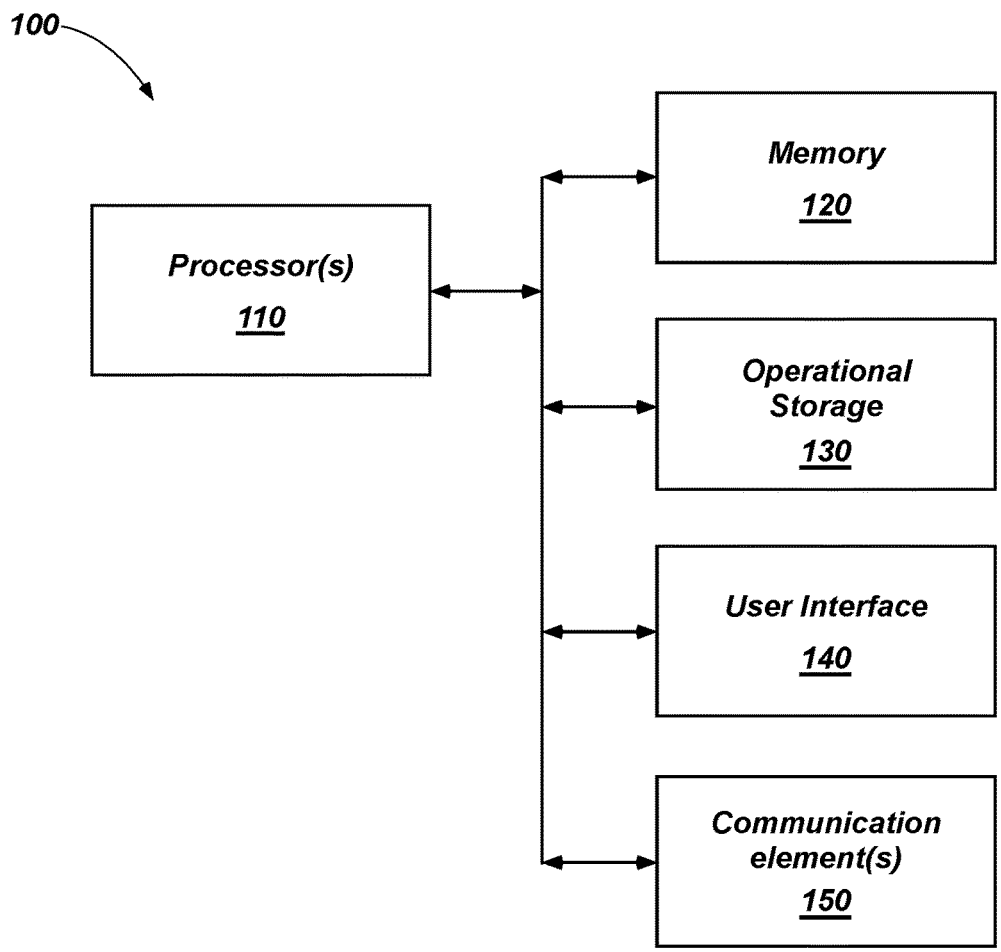
FIG. 1 is a simplified block diagram of a computing system configured for carrying out one or more embodiments of the present disclosure.

The illustrations presented herein are not meant to be actual views of any particular material, apparatus, system, or method, but are merely idealized representations that are employed to describe certain embodiments of the present invention. For clarity in description, various features and elements common among the embodiments of the invention may be referenced with the same or similar reference numerals.

Those of ordinary skill would appreciate that the various illustrative logical blocks, modules, circuits, and algorithm acts described in connection with embodiments disclosed herein may be implemented as electronic hardware, computer software, or combinations of both. To clearly illustrate this interchangeability of hardware and software, various illustrative components, blocks, modules, circuits, and acts are described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the embodiments described herein.

In addition, it is noted that the embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more instructions or code on a computer-readable medium. Computer-readable media includes both computer storage media and communication media including any medium that facilitates transfer of a computer program from one place to another.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or combinations thereof. Some drawings may illustrate signals as a single signal for clarity of presentation and description. It should be understood by a person of ordinary skill in the art that the signal may represent a bus of signals, wherein the bus may have a variety of bit widths and the present disclosure may be implemented on any number of data signals including a single data signal.

According to embodiments disclosed herein, the conditions within a well may be monitored to determine the integrity of the well during the life of the well. Monitoring of the well may include monitoring the chemical properties and/or physical properties, such as pH, redox potential, chemical composition (including gases that may be present in a fluid sample), viscosity, electrical conductivity (or the electrical resistivity), and salinity and density of a fluid such as a drilling fluid, formation fluid, completion fluid, stimulation fluid, injected fluid, produced fluid, and mixtures thereof, during normal operations, including during drilling, production, well testing, and well remediation. Monitoring of the chemical and physical properties of a fluid exiting the well may enable the detection of possible interactions (e.g., corrosion, degradation, etc.) between the fluids within the well and technical components and downhole equipment (e.g., drilling equipment, casing, liner, tubing, packers, etc.) within the wellbore, as well as interactions with cement employed to line the wellbore and the formation.

As used herein, the term "produced fluid" means and includes the fluid produced by the well at the surface of the well, mostly including the formation fluid (such as, hydrocarbons, water, or emulsions of hydrocarbons and water), but which can be mixed and interact with residual drilling fluid, stimulation fluid, completion fluid or injected fluids. The term "wellbore equipment" as used herein means and encompasses equipment and material components disposed in a wellbore during drilling, completion, injection, and production (including stimulation and other remedial actions within the wellbore). For example, wellbore equipment includes casing strings, liner strings, tubing, cement, drilling equipment, and sealing equipment such as packers and elastomers. The integrity of the wellbore equipment within the well may be monitored using modeling methods described herein in combination with regular or occasional sampling of fluids. Based on the results of sampling compared to predicted modeling results, the operation of the wellbore may be altered to maintain the integrity of the well.

Embodiments of the disclosure include systems and related methods for determining the occurrence of degradation within a wellbore during drilling, completion, injection, stimulation, and production. As used herein, the term "degradation" means and includes any form of damage, including corrosion, erosion, cracking, and the combination of these mechanisms etc. Furthermore, degradation of a wellbore may include an influx of formation fluid into the well during drilling (what is known in the art as a "kick").

Degradation also includes the release of toxic or corrosive gases from the formation that may damage materials within the well.

FIG. 1 is a simplified block diagram of a computing system 100 configured for carrying out one or more embodiments of the present disclosure. The computing system 100 is configured for executing software programs containing computing instructions and may include one or more processors 110, one or more memory 120 devices, one or more operational storage 130 devices, one or more communication elements 150, and one or more user interface 140 devices.

The one or more processors 110 may be configured for executing a wide variety of operating systems and applications including the computing instructions for carrying out embodiments of the present disclosure.

The memory 120 may be used to hold computing instructions, data, and other information for performing a wide variety of tasks including performing embodiments of the present disclosure. By way of example, and not limitation, the memory 120 may include Synchronous Random Access Memory (SRAM), Dynamic RAM (DRAM), Read-Only Memory (ROM), Flash memory, phase change memory, and other suitable information storage devices. The memory 120 may include data related to the formation, including the chemical composition of the formation, as well as the mineralogical data about the formation. As used herein, the composition of a material means and includes a concentration of at least one chemical species (e.g., element, ion, molecule, compound, substance, etc.) in the material. As used herein, if not specified, the composition of the formation refers to one or both of the chemical composition and the mineralogical composition of the formation. The formation may also refer to fluids present within the formation (i.e., formation fluids) and the composition of the formation may also refer to the composition of such formation fluids. The formation may also refer to any formation fluids present within the formation. The memory 120 may include data relating to wellbore equipment such as chemical composition of materials used for casing strings, liner strings, drill strings, production strings, and cement within the well. The memory 120 may also include data relating to other well-related variables such as chemical composition and pH of the formation fluid (e.g., formation water, gases, and other hydrocarbons within the formation, etc.), information such as the chemical composition of drilling fluid into and out of the well, information about the chemical composition of a produced fluid leaving the well, information about the chemical composition of the stimulation fluid and the chemical composition of a completion fluid. The memory 120 may include historical information, such as historic drilling fluid chemical composition into and out of the well and historical chemical composition data of produced fluids leaving the well. The memory 120 may also include information about the physical properties of such fluids, such as information about the density, viscosity, and electrical conductivity of the fluids. The fluid leaving the well may be monitored for changes in physical or chemical properties such as changes in the concentration of particular chemical species, or changes in at least one of density, viscosity, electrical conductivity, salinity, redox potential, and pH of such fluids. The memory 120 may also include information about temperatures and pressures at various depths and locations within the formation and the wellbore.

The communication elements 150 may be configured for communicating with other devices or communication networks. By way of example, and not limitation, the communication elements 150 may include elements for communicating on wired and wireless communication media, such as, for example, serial ports, parallel ports, Ethernet connections, universal serial bus (USB) connections IEEE 1394 ("firewire") connections, bluetooth wireless connections, 802.1 a/b/g/n type wireless connections, cellular phone wireless connections and other suitable communication interfaces and protocols. Typically, communication between downhole equipment and surface can be performed via mud-pulse telemetry, wired-pipe technology, transmission via electromagnetic or acoustic fields, wireline, fiber optic wireline, and other devices.

The operational storage 130 may be used for storing information in non-volatile memory for use in the computing system 100. The operational storage 130 may be configured as one or more storage devices. By way of example, and not limitation, these storage devices may include computer-readable media (CRM). This CRM may include, but is not limited to, magnetic, optical, and solid state storage devices such as disk drives, magnetic tapes, CDs (compact discs), DVDs (digital versatile discs or digital video discs), FLASH memory, and other suitable information storage devices.

The user interface 140 may include input devices and output devices operably coupled to the processor 110. By way of non-limiting example, the input devices may include elements such as a keyboard, a numerical keypad, a mouse, a touchscreen, a button array, a track pad, a remote control, cameras, sensors, a microphone, and combinations thereof. The input devices may be configured to receive commands from the user and present the commands to the processor 110 to perform operations responsive to the commands. The input devices may include sensors, cameras, or combinations thereof configured to capture the signals used in the analysis discussed herein. In some embodiments, the input devices include temperature sensors, pressure sensors, sensors for assessing the density, viscosity, electrical conductivity, and pH of a fluid, and sensors for measuring the chemical composition of a fluid in real-time. In other embodiments a pH, density, viscosity, electrical conductivity, and the concentration of chemical species of a fluid may be measured in a laboratory and input into the user interface 140 through an input device. Such information may be stored in the memory 120. In some embodiments, a portion of the input devices (e.g., including sensors, camera, or combinations thereof) may not be a part of the user interface 140.

By way of non-limiting example, the output devices may include one or more displays such as a light-emitting diode (LED) array, a segmented display, a liquid crystal display, a cathode ray tube display, a plasma display, and other types of electronic displays. The output devices may also include other peripheral output devices, such as speakers. In some embodiments, the input devices and the output devices may be integrated in or controlled by the same device, such as, for example, a touchscreen display. In other embodiments, the input devices and the output devices may be implemented in separate devices, such as a keyboard and an LCD monitor, respectively. In some embodiments, the output device may display one or more recommended actions determined by the computing system 100 for reducing degradation of a well.

Software processes illustrated herein are intended to illustrate representative processes that may be performed at least partly by one or more computing systems 100 in carrying out embodiments of the present disclosure. Unless specified otherwise, the order in which the processes are described is not to be construed as a limitation. By way of example only, software processes may be stored on one or more operational storage 130 devices, transferred to a memory 120 for execution, and executed by one or more processors 110. Some or all of the software program may be stored and executed remotely and accessed (e.g., as a web interface). Also, some or all of the software program may be stored and executed as a standalone application on a computer, or a personal communication device such as a tablet computer or a cellular telephone.

When executed as firmware or software, the instructions for performing the processes may be stored or transferred on a computer-readable medium. In addition, when executing firmware or software instructions, the computing system 100 should be considered a special purpose computing system and the processor 110 may be considered a special purpose processor configured for carrying out embodiments of the present disclosure.

Other combinations or separations of the elements of the computing system 100 are possible, and those of ordinary skill in the art will appreciate that signals may be communicated between the various elements of the computing system 100 in various ways. By way of non-limiting example, the user interface 140 may be implemented remote from the operational storage 130 as a portable communication device, such as a tablet computer or a remote control. The user interface 140 may be configured to send and receive signals to the processor 110 through any of the communication elements(s) 150, a mobile data network, infrared, Bluetooth, a wireless network, a cable, and combinations thereof.

The processor 110 may be configured to control the computing system 100. The processor 110 may be operably coupled to the memory 120, the operational storage 130, the user interface 140, and the communication element 150. The processor 110 may be configured to receive information from the user interface 140 (e.g., such as from an input device) and the memory 120 and process the data to determine one or more conditions within the well. The processor 110 may predict a current condition of the well by satisfying thermodynamic equations, chemical kinetics equations, geochemical equations, and combinations thereof. The thermodynamic equations, chemical kinetics equations, and geochemical equations may receive inputs from the memory 120 and the user interface 140. The processor 110 may determine one or more conditions within the well, such as one or more reactions that may take place within the well, one or more reaction byproducts, a composition of one or more fluids, or a condition (e.g., pH, density, viscosity, temperature, resistivity, redox potential, salinity, chemical composition, etc.) of one or more fluids.

The one or more reactions within the well may include a reaction between at least one of a drilling fluid, a completion fluid, a stimulation fluid, an injected fluid, a formation fluid, a produced fluid, the formation, and the wellbore equipment with at least another of the drilling fluid, the completion fluid, the stimulation fluid, the injected fluid, the formation fluid, the produced fluid, the formation, and the wellbore equipment. The one or more reactions may include one or more of a corrosion reaction and any other type of degradation reaction of wellbore equipment. In some embodiments, where the processor 110 predicts or detects one or more significant reactions that may take place within the well (e.g., degradation, corrosion, etc.), the processor 110 may recalculate (e.g., predict) one or more reactions that may take place within the well and determine one or more reaction byproducts, changes in composition of a fluid exiting the well, or changes in a condition of a fluid exiting the well based on an altered chemical composition of fluid being pumped into the well (e.g., the drilling fluid, stimulation fluid, completion fluid, injected fluid, a corrosion inhibitor, scavengers, biocides, and mixtures thereof, etc.). The processor 110 may predict or detect the one or more reactions that may take place within the well prior to operation of the wellbore or during operation of the wellbore. The processor 110 may send an electronic signal to the user interface 140 or to a chemical injection pump to alter a concentration of a chemical species of a fluid being pumped into the well. For example, the processor 110 may recommend changing the composition of a fluid being pumped into the well to reduce degradation of the well. The recommendation may be transferred to a user via the output device of the user interface 140. The processor 110 may also determine an optimal altered composition by iteratively altering a composition of the fluid to be pumped downhole. The altered composition may be based on predictions made by the processor 110 about reactions of the altered fluid composition below the surface of the formation. The composition alteration may take place until the processor 110 predicts that the fluid being pumped into the well does not cause substantial degradation of the well and/or wellbore equipment.

The processor 110 may determine one or more conditions that are characteristic of the one or more predicted reactions within the well. The one or more conditions may include characteristic properties (e.g., marker materials) that include a change in a concentration of a particular chemical species (e.g., an ion, element, compound, molecule, substance, material, etc.) in a fluid exiting the well or a change in a property, such as density, viscosity, electrical conductivity, redox potential, salinity, or pH, of the fluid exiting the well. Each characteristic property or combination of characteristic properties may be specific to a type of reaction taking place within the well. For example, the presence of particular chemical species, ions, elements, compounds, or molecules in a fluid leaving the wellbore may be an early indication of integrity degradation of wellbore equipment (such as corrosion), an indication that the formation pressure is higher than the well pressure and formation fluid is entering the well, or an indication that cement within the well is damaged.

The processor 110 may compare a predicted composition or condition of a fluid exiting the well to the current composition or condition of a fluid exiting the well. The processor 110 may indicate when the current condition of the well is different from that predicted by the processor 110. For example, a fluid exiting the well may be analyzed and information (e.g., composition, pH, density, viscosity, conductivity, etc.) about the fluid exiting the well may be stored in the memory 120. The processor 110 may compare the information in the memory 120 to the predicted conditions of the fluid exiting the well. Where a condition of the fluid exiting the well is substantially different than predicted by the processor 110, the processor 110 may suggest, initiate, or control altering a composition of a fluid being pumped into the well. For example, the processor 110 may send an electronic signal to an output device of the user interface 140 directing an operator to adjust a composition of a fluid (e.g., a drilling fluid) into the well. In another embodiment, the processor 110 may send an electronic signal to the communication element 150 to send a signal to a chemical injection pump to alter an injection rate of a particular material into the well.

The composition of the produced fluid at the surface of the wellbore may be predicted by software of the computing system 100 including programs, modules, and algorithms for identifying and simulating chemical reactions that may take place between the drilling fluid, stimulation fluid, formation fluids, the formation, and wellbore equipment using one or more of thermodynamic-based, reaction kinetics-based, and geochemical-based algorithms to predict reactions that may take place within a wellbore system. The software of the computing system 100 may also include programs, modules, and algorithms for identifying and simulating physical and chemical processes that take place as the fluids travel from high temperature and high pressure environments below the earth's surface to lower pressures and temperatures as they travel through the wellbore to the earth's surface. For example, formation fluid may change as it comes to the surface due to changes of physical parameters, (e.g., temperature and pressure between subsurface and surface). The software may also compare data produced by analyzing samples of the fluid leaving the well with the predicted composition and properties of the fluid leaving the well based on geochemical modeling and historical data regarding chemical and physical properties such as pH, chemical composition, density, viscosity, electrical conductivity, redox potential, salinity, etc., of the produced fluid.

The software for modeling chemical reactions within the well may be free or commercially available software, such as PHREEQC, available from the United States Geological Survey (USGS), TOUGHREACT, available from the Lawrence Berkeley National Laboratory, or Aspen Plus®, available from Aspen Technology, Inc., of Burlington Mass., for modeling thermodynamic and kinetic modeling of reactions. Software for modeling corrosion may include NORSOK M-503 according to the Norwegian standard M-503, Cassandra corrosion model from BP of London, England, de Waard from Shell International, Multicorp available from the Ohio University, Predict from Honeywell Process Solutions, of Honeywell of Morristown, N.J., or other corrosion models. In one aspect, the software may be used by the one or more processors 110 to analyze some or all of the information in the memory 120 to estimate or predict one or more parameters of well operation. Inputs into the software program may include information stored in memory 120 such as one or more of the temperature and pressure within the formation, thermodynamic equations, reaction kinetic equations, information about the composition of equipment and components within the wellbore, the composition of the formation, the composition of formation fluid, the composition of stimulation fluid, the composition of drilling fluid, the composition of the completion fluid, and the composition of the injected fluid. The thermodynamic equations and reaction kinetic equations may utilize the inputs (e.g., temperature, pressure, composition of the formation and various fluids) to predict chemical reactions that may take place within the wellbore.

Figure 2:
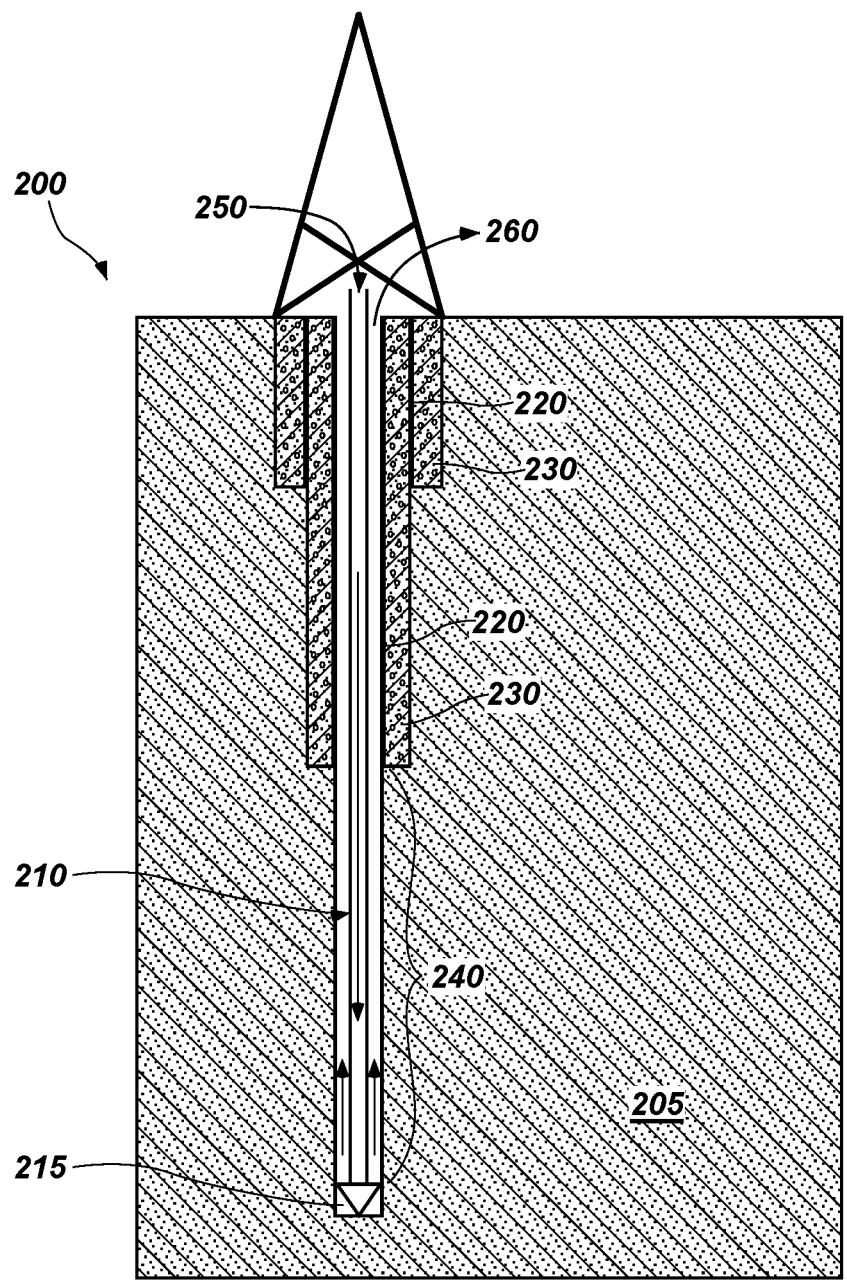
FIG. 2 is a cross-sectional side view of a well during a drilling process.

FIG. 2 illustrates a downhole system 200 during a drilling process. A drill string 210 may be connected to a motor or rotation inducing element to form a wellbore in a subterranean formation 205. A cutting element 215 such as a drill bit, a reamer, etc., may be at a distal end of the drill string 210. A metal casing 220 may line the borehole formed in the subterranean formation 205. Cement 230 may be formed between the metal casing 220 and the subterranean formation 205. Sections of the wellbore where the drill string 210 is not surrounded by a metal casing 220 or cement 230 may be referred to as an open hole 240. The downhole system 200 may include additional casing strings, including intermediate casing (not shown). Drilling fluid may pass through the downhole system 200 through an inlet 250 and exit at an outlet 260.

Figure 3:
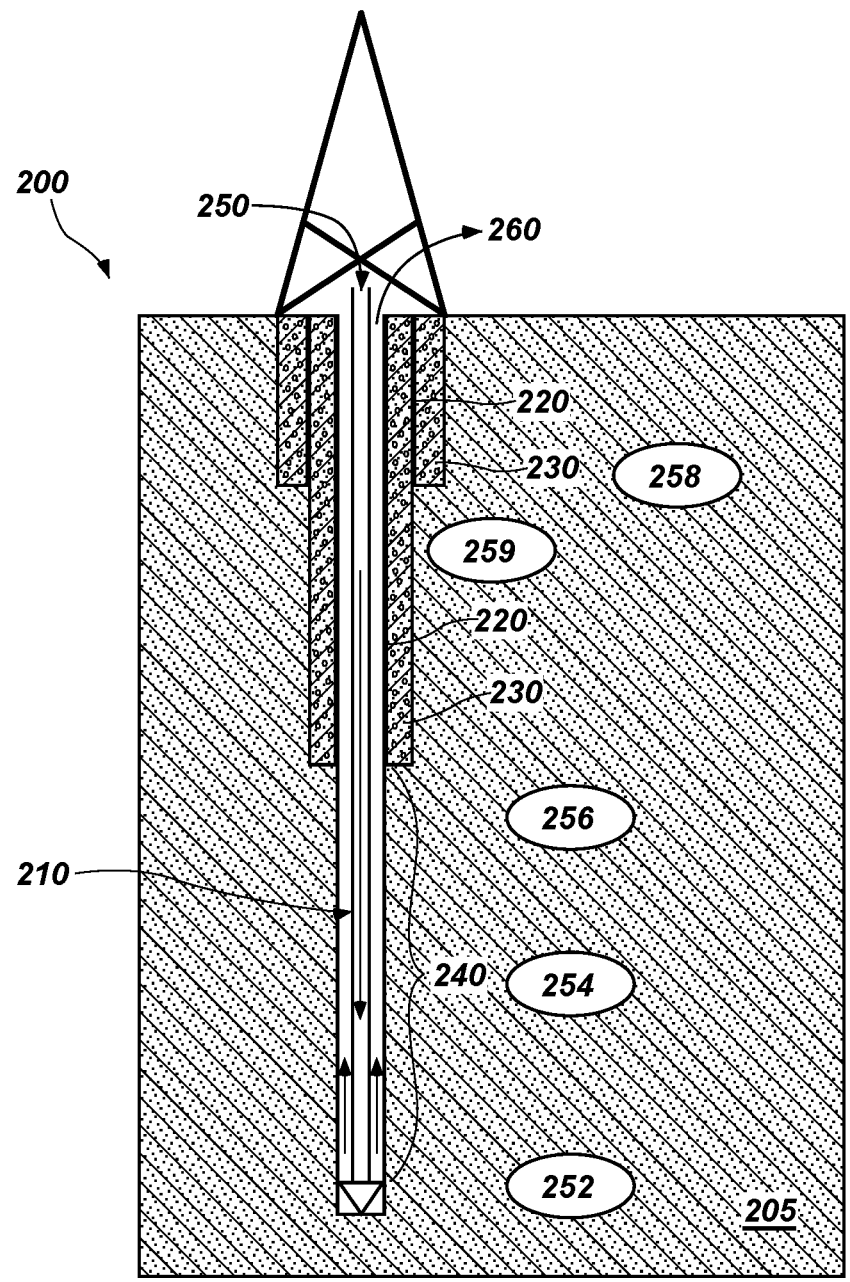
FIG. 3 is a cross-sectional side view of a well during a drilling process and showing possible interactions between fluid, technical equipment, and the formation.

Referring to FIG. 3, a downhole system 200 is shown including the various ways a drilling fluid may interact with the downhole system 200. FIG. 3 illustrates various reactions that may take place between the drilling fluid and the downhole system 200. For example, the drilling fluid may react with formation fluid in the borehole or in the vicinity of the borehole in reaction 252 along the open hole 240 sections of the wellbore, the drilling fluid may react with the formation in reaction 254, the drilling fluid may react with materials of the various components of the drill string 210 in reaction 256, the drilling fluid may react with the metal casing 220 in reaction 258, and the drilling fluid may react with cement 230 in reaction 259.

Figure 4:
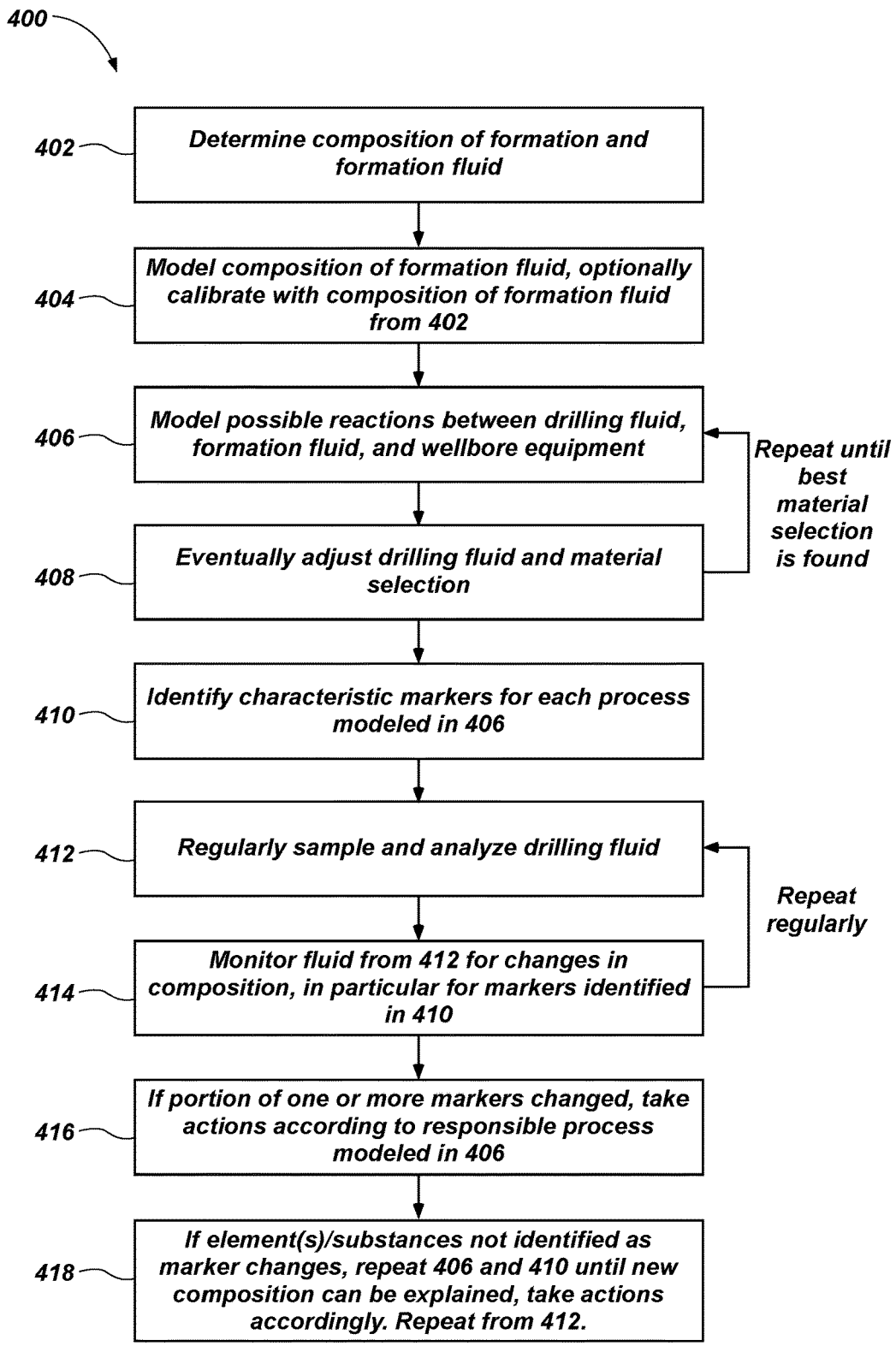
FIG. 4 is a simplified flow diagram for monitoring of a wellbore during the drilling process according to embodiments of the disclosure.

Referring to FIG. 4, with continued reference to FIG. 1 through FIG. 3, a method 400 of monitoring, and potentially reducing, integrity degradation of one or more components of a downhole system (e.g., a component of a drilling system or a component of a partially completed well) during a well operation is shown. The method 400 includes act 402 of determining a chemical composition of a formation and the formation fluid. Information for characterizing the composition of each of the formation and the formation fluid, may be obtained from samples obtained from a well proximate the downhole system to be monitored, or from the wellbore being drilled. For example, at least a portion of the information may be obtained from samples of the formation core or fluid samples in the same well or from an adjacent well. The samples of the formation and the formation fluid may be obtained subsurface (e.g., coring) or at the surface (e.g., cuttings). The samples may be analyzed subsurface or may be brought to the surface and analyzed at the surface. The core samples and the fluid samples may be analyzed downhole and analysis transmitted in-situ or the samples may be stored in a downhole tool, brought to the surface, and retrieved from the tool at the surface for further analysis. In some embodiments, a starting composition of the fluid is determined by assuming that the formation fluid includes pure water or an assumed hydrocarbon composition (e.g., based on known well date of adjacent wells). In some embodiments, properties of the formation and the formation fluid, such as the composition of the formation, the type of formation fluid (e.g., water, hydrocarbon, or mixture thereof), and salinity of the formation fluid may be determined from downhole logging. Logging may include resistivity logging, porosity logging, spectral gamma ray logging, mineralogical logging, or other logging technique employed throughout the industry. In some embodiments, resistivity logging may be used to determine a property indicative of the composition of the formation fluid, such as the salinity of the formation fluid.

Act 404 may include predicting a composition of the formation fluid based on the assumed starting composition of the formation fluid, the composition of the formation, and the temperature and pressure within the formation. The assumed starting composition of the formation fluid may be pure water. In other embodiments, the assumed starting composition of the formation fluid may be an assumed hydrocarbon composition, based on known well and formation data of wells proximate the wellbore. The composition of the formation fluid may be estimated based on the assumed starting composition and predicted ways the assumed composition of formation fluid interacts with the formation at temperatures and pressures within the well. In one embodiment, the software may predict the composition of the formation fluid based on predicted interactions between the formation and pure water using information about the chemical composition and the mineralogical composition of the formation.

In some embodiments, the composition of the formation fluid may be calibrated. The software may predict the composition of the formation fluid as it passes from high temperatures and pressures within the formation to the surface and may predict the composition of the formation fluid at the surface. For example, solids may precipitate or gases may degas out of the formation fluid as the formation fluid passes from high temperature and high pressure subsurface to the surface. The predicted composition of the formation fluid may be compared to the composition of an actual sample of the formation fluid obtained to calibrate the model. For example, where the composition of the formation fluid at the surface predicted by the processor 110 does not match the actual composition of the fluid exiting the well, the inputs to the software may be adjusted (i.e., calibrated) until the composition of the formation fluid at the surface matches the actual composition of the formation fluid at the surface. At least one of the thermodynamic and chemical reaction kinetic inputs and the temperature and pressure within the well may be altered until the predicted composition of the fluid exiting the well matches the actual composition of the fluid exiting the well. For example, a predicted temperature or a predicted pressure may be altered until the predicted composition of the fluid exiting the wellbore matches the actual composition of the fluid exiting the wellbore. When the predicted composition of the formation fluid at the surface matches the actual composition of a sample of the formation fluid at the surface, the composition of the formation fluid subsurface may be validated. Thus, the modeled formation fluid within the wellbore may become a reference fluid for modeling processes that occur subsurface.

In other embodiments, the composition of the formation fluid subsurface is determined based on the composition of a sample of the formation fluid at the surface and predicted (e.g., modeled) changes in composition of the formation fluid as the formation fluid travels from high temperature and high pressure subsurface to atmospheric temperature and pressure at the surface. For example, the composition of the formation fluid may alter as it travels from below the surface to the surface because of changes in temperature and pressure as the formation fluid travels toward the surface. In some embodiments, the software program may interact with the one or more processors 110, the user interface 140, the operational storage 130, the memory 120, and the communication elements 150 to predict a composition of the formation fluid at a surface of the wellbore.

Act 406 includes predicting possible chemical reactions (e.g., reactions 252, 254, 256, 258, and 259) that may take place in the well. The chemical reactions may be predicted by the computing system 100 and the processor 110 as described above. Potential reactions include reactions between the drilling fluid, and at least one of the formation fluid (e.g., using the predicted composition of the formation fluid within the well), the formation, and the well equipment (e.g., drill string, casing string, coiled tubing, production tubing, downhole pumps, valves, sensors, etc.), or other wellbore equipment. The computing system 100 may consider the effects of changes in temperature and pressure as fluids travel from below the surface to the surface. In some embodiments, the computing system 100 accounts for degassing or precipitation of solids as fluids travel from higher temperatures and higher pressures below the surface to surface temperatures and pressures (e.g., ambient temperature and pressure).

By way of non-limiting example, reaction 252 between the drilling fluid and the formation fluid may include mixing of the formation water with the drilling fluid, such as where a pressure of the formation fluid is higher than a pressure of the drilling fluid and the formation water flows into the well and mixes with the drilling fluid (i.e., a "kick"). For example, severe kicks may be related to the volume expansion of gases as they are brought from high pressures within the formation to atmospheric pressure at the surface. In some embodiments, the amount of formation fluid entering the wellbore may be predicted by estimating (e.g., with the computing system 100) the volume of gas that may be released per unit volume of formation fluid transported from subsurface to the surface. The actual volume of gases exiting the borehole may be compared to the predicted volume of gases that would exit the borehole per unit volume of formation fluid.

In some embodiments, the computing system 100 may predict how the drilling fluid may interact with the formation, the formation fluid, or the well equipment in one or more reactions. For example, reaction 254 (FIG. 3) may include a reaction of the drilling fluid with the formation fluid. In some embodiments, the drilling fluid may interact with acid gases such as $CO_2$, $H_2S$, or other materials present within the formation. In other embodiments, chloride ions may be dissolved into the drilling fluid. The $CO_2$, $H_2S$, or chloride ions may dissolve in the drilling fluid and cause further reactions with the drilling fluid. For example, the acid gases may consume acid gas scavengers, or may reduce the concentration of bases such as magnesium oxide or other additives in the drilling fluid or mud, or may alter physical properties of the drilling fluid by degrading viscosifiers present in the drilling fluid. Reaction 256 may include a reaction between the drilling fluid and the drill string 210. For example, materials such as $H_2S$ or $CO_2$ may corrode or degrade construction material such as metallic materials, composite materials, hard metals such as cemented carbide, elastomers, sealing materials, polytetrafluoroethylene (PTFE), polyetheretherketone (PEEK), and cement in the well. The presence of particular organic molecules and functional groups found in elastomers, polymers, and sealing materials within a well may be an early indication of degradation of elastomers, polymers and sealing materials. The presence of metallic ions of metals used as construction material in the drill string 210 (such as ions of iron, nickel, chromium, cobalt, aluminum, manganese, titanium, copper, etc.) may be an early indication of corrosion of the drill string 210. Reaction 258 may include a reaction between the drilling fluid and the metal casing. Ions of one or more metals forming the metal casing in the drilling fluid exiting the wellbore may be an indication of degradation of the metal casing. By way of non-limiting example, the presence of metallic ions such as ions of iron (e.g., $Fe^{3+}$, $Fe^{2+}$), ions of chromium (e.g., $Cr^{3+}$), ions of titanium ($Ti^{2+}$), and ions of nickel (e.g., $Ni^{2+}$) may be an early indication of corrosion of the casing material. Reaction 259 may include a reaction between the drilling fluid and the cement of the wellbore. A change in the pH of a fluid exiting the well, a decrease in the concentration of magnesium, or an increase in silicates may be an indication of degradation of cement within the wellbore.

Act 408 includes adjusting the composition of the drilling fluid based on the reactions predicted in act 406. For example, the composition of the drilling fluid may be altered to improve (e.g., optimize) the compatibility of the drilling fluid with the formation, the formation fluid, and equipment within the wellbore (e.g., lower the reactivity between the drilling fluid and the formation, formation fluid, well equipment, and/or cement). If the computing system 100 predicts considerable interactions between the drilling fluid and at least one of the formation fluid, the formation, the wellbore equipment, and cement, the composition of the drilling fluid may be adjusted to reduce or minimize such reactions. After the drilling fluid composition is adjusted, act 406 may be repeated to predict the possible reactions between the altered drilling fluid composition and the downhole system. In some embodiments, act 408 may be repeated for various drilling depths based of the composition of the formation fluid at various depths within the well. For example, in deep wells, changes in formation and formation fluid composition with depth may require changes in drilling fluid composition at different depths within the well. Thus, at least one of acts 408, 406, 404, and 402 may be repeated at various depths within the subterranean formation 205 to predict what types of reactions may occur at various depths.

In each of the potential reactions between the drilling fluid and the downhole system 200, specific characteristics (e.g., reaction byproducts, pH change in fluid at the surface, etc.) may be identified by the computing system 100 to predict when and where particular reactions are taking place within the well. Act 410 includes identifying marker materials (e.g., identifiers), that may be an indication of a condition within the well. Each of the reactions predicted by the computing system 100 in act 406 may result in one or more unique marker materials, such as a particular compound, element, ion, change in pH, change in density, change in viscosity, etc., that may be indicative of a particular reaction taking place within the well. The computing system 100 may identify one or more unique marker materials of each of the reactions predicted and may output this information to a user interface 140. By way of non-limiting example, where the formation water includes lithium or strontium, the presence of lithium or strontium in a drilling fluid sample may be an early indication that the formation water is mixing with the drilling fluid. As another non-limiting example, degradation of cement lining the wellbore may be detected by a decreased concentration of magnesium, and changes in pH, or combinations thereof in a fluid exiting the well. Iron corrosion may be detected by reduced sulfate concentrations, increased iron concentrations, changes of pH, and combinations thereof, of the fluid exiting a well. Metal corrosion may also be indicated by ions of iron, chromium, nickel, and titanium in the fluid exiting the well.

The drilling fluid may be continuously monitored for one or more marker materials that are indicative of the conditions within the well (e.g., degradation reactions such as corrosion reactions or other undesired reactions). Additional marker materials can be intentionally included in components and coatings as indicators for integrity degradation to improve the sensitivity of the system.

In some embodiments, at least a portion of the wellbore may be formed from a multi-layered tubular component or a multi-layer coating may be applied on a component of particular interest. Each layer (e.g., coating) may be configured to provide at least one marker material upon degradation. Act 410 may include identifying the chemical markers that may be formed when such multi-layered tubular components or coatings degrade. For example, a tubular component (e.g., a casing string, a production string, etc.) may include one or more distinct layers of various materials. The multi-layered tubular component may include an exposed layer with a defined thickness and chemical composition, for instance, a magnesium-rich layer, which will be contacted with the drilling fluid, and at least a second layer under the first layer. The second layer may be formed of a different composition than the first layer, such as from an aluminum-rich layer. Degradation of the first layer may form a first marker material. An increase in a concentration of the first marker material (e.g., magnesium) in a fluid leaving the well may indicate corrosion or degradation of the first layer. As the first layer corrodes or degrades, the second layer may be exposed. Degradation of the second layer may form a second marker material (e.g., aluminum). An increase in a concentration of the second marker material in the fluid leaving the well may indicate degradation of the second layer. In some embodiments, a third layer, a fourth layer, etc., may be formed under the second layer. Each layer may include a different composition than surrounding layers. In some embodiments, a first layer, a third layer, a fifth layer, etc., are formed from a first composition whereas a second layer, a fourth layer, a sixth layer, etc., are formed form a second composition. The layer may be continuous or discontinuous. In some embodiments, the layer or coating includes one or more regions (e.g., pockets) filled with the marker material within the tubular component. The pocket may be exposed and the marker material may be released after a predetermined amount of degradation of the tubular component. The tubular component may include a plurality of pockets including one or more marker materials configured to be released after a predetermined amount of degradation of the tubular component. For each predetermined amount of degradation of the tubular component, a different marker material may be released. The memory 120 may include information (e.g., the location of, the amount and type or marker material, etc.) about each of the layers or regions of the multi-layered tubular component.

Degradation of each of the layers may form a marker material that is not otherwise present in any of the formation fluid, drilling fluid, or stimulation fluid within the subterranean formation. Once the first layer begins to corrode, the first marker material may be detected in the produced fluid. When the next layer of the wellbore construction begins to corrode, a concentration of the first marker material in a fluid exiting the well may decrease and a concentration of the second marker material may increase in the fluid exiting the well. In this manner, the corrosion of the overall wellbore construction may be monitored.

In some embodiments, the wellbore construction may include varying compositions at various depths or wall thicknesses of the wellbore. For example, the wellbore construction may include materials or coatings such that marker materials are released after corrosion has reached a certain depth. The marker materials may be selected to be distinct from the composition of the drilling, stimulation, and formation fluids. These marker materials may be detected at a low concentration. In some embodiments, the marker materials include metal-binding dyes such as rhodamine B and fluorescein.

Act 412 includes obtaining samples of the drilling fluid and analyzing the samples for the presence of one or more marker materials identified in act 410. Thus, the drilling fluid or fluid leaving the well may be repeatedly analyzed to determine the presence of the characteristic marker materials identified in act 410. The composition and properties such as pH, density, viscosity, conductivity, salinity, and redox potential of the drilling fluid may be stored in memory 120.

Act 414 includes monitoring the fluid obtained in act 412 for changes in composition. In particular, a change in a concentration of a particular marker material or group of marker materials may be identified by comparing a current sample analysis to past sample analyses. In some embodiments, the computing system 100 compares a current sample of the drilling fluid to historic data stored in the memory 120. Thus, the drilling fluid may be monitored for changes in the concentration of particular elements, ions, compounds, chemical species, and for changes in pH, changes in density, changes in viscosity, and changes in conductivity. In other embodiments, the computing system 100 may predict the composition and properties of the drilling fluid exiting the well and compare the predicted properties to the properties of the current sample of the fluid leaving the well. Act 412 and act 414 may be repeated at regular or irregular intervals and the results may be stored in memory 120. In some embodiments, act 412 and act 414 are repeated every hour, every several hours, every day, or as otherwise desired. In other embodiments, act 412 and act 414 may be repeated at incremental drilling depths, such as every 50 feet, every 100 feet, or every 250 feet.

In some embodiments, the sensitivity of the monitoring system can be improved by adding a dye to an analyzed fluid or to a drilling fluid. The dye may become fluorescent when it binds to metal ions. Non-limiting examples of such dyes include rhodamine B and fluorescein. The dyes may detect the presence of metal ions, such as $Cu^{2+}$, $Pb^{2+}$, and $Fe^{3+}$. When the dye molecule reacts with a metal ion, such as those produced from the corrosion of well materials, the dye may fluoresce under UV light. In some embodiments, act 414 may include monitoring a fluid leaving the well with a sensor to determine the fluorescence of the fluid leaving the well. An increase in the fluorescence of the fluid leaving the well may be an indication of corrosion within the well.

The samples obtained in act 414 may be analyzed by any suitable method for determining a composition, a concentration of one or more elements, ions, compounds, or chemical species, and a suitable method of determining a pH, viscosity, density, redox potential, and/or electrical resistivity. In some embodiments, the composition of the sample, or the presence and/or concentration of one or more elements, molecules, compounds, or chemical species within the sample, may be determined by atomic absorption spectroscopy (AAS), inductively coupled plasma mass spectrometry (ICP-MS), atomic emission spectroscopy (AES), Fourier transform infrared (FTIR) spectroscopy, fluorescence spectroscopy, gas chromatography, high-performance liquid chromatography (HPLC), volumetric analysis, optical analysis, gravimetric analysis, electrochemical analysis, other methods to determine chemical composition (e.g., the presence of one or more marker materials within the sample), physical properties, and combinations thereof. In some embodiments, the solution composition and pH may be monitored at the surface by obtaining samples at the surface. In other embodiments, the drilling fluid may be at least partially analyzed below the surface with one or more sensors located within the downhole system.

Corrective action may be taken when one or more marker materials identified in act 410 is present in the drilling fluid exiting the well sampled in act 412. Act 416 includes taking a particular action if one or more of the identified markers is present in a sample obtained in act 412. For example, if the drilling fluid at the surface includes one or more markers indicative of degradation within the well, the composition of the drilling fluid into the well may be adjusted to mitigate the reactions. In some embodiments, the processor 110 may send a signal to alter a concentration of a drilling fluid being pumped into the well. For example, the processor 110 may send a signal to a chemical injection pump to increase a concentration of a corrosion inhibitor, an oxygen scavenger, an $H_2S$ scavenger, or other additive into the well. Non-limiting examples of corrosion inhibitors include chemicals that form a thin film on a metal surface to passivate the exposed metal surfaces. In some embodiments, the corrosion inhibitor is a filming amine. If the concentration of lithium or strontium (or any other element present in the formation water) increases, the density of the drilling fluid may be increased to reduce or eliminate the formation water from flowing into the well. In other embodiments, fluid losses may be mitigated by stabilizing the wellbore, such as by fracture sealing, stress caging, or other stabilization techniques. If the concentration of a metal ion such as chromium, iron, nickel, magnesium, cobalt, lead, copper, manganese, titanium, etc., increases, the drilling fluid composition may be adjusted. The concentration of the corrosion inhibitors may be monitored to determine the effectiveness of the inhibitors. In some embodiments, the concentration of a filming amine in the drilling fluid may be monitored to determine the effectiveness of the treatment. In other embodiments, an additive, such as ethylenediaminetetraacetic acid (EDTA) is added to the drilling fluid to reduce or eliminate the precipitation of solids (e.g., barium sulfate) within the wellbore or scale inhibitors or scale removers are added if scaling within the well is expected. The concentration of corrosion inhibitors, scale inhibitors, or scavengers added to the drilling fluid to reduce corrosion, scaling, or degradation may be monitored to determine the effectiveness of the additives.

Act 418 includes actions that may be taken if the sample obtained in act 412 includes marker materials not predicted by the computing system 100 in act 406 or act 410. Act 418 includes repeating act 406 and act 410 until the computing system 100 predicts the marker material that was initially unpredicted by the computing system 100. In some embodiments, the computing system 100 may predict a reaction that may cause the previously unpredicted marker material to form. For example, an assumed (e.g., predicted) temperature or pressure of the formation, or an estimated composition of the formation or formation fluids may be altered until the predicted composition of the formation fluid at the surface sufficiently matches the composition of a sample at the surface within acceptable tolerances. The computing system 100 may iteratively alter at least one of the assumed temperature of the formation and a composition of the formation or formation fluid in an iterative process until the predicted composition of the formation fluid at the surface matches the composition of a sample at the surface within acceptable tolerances. In some embodiments, the temperature and pressure may be predicted or modeled based on the depth of the formation or formation fluid.

Although FIG. 4 has been described with reference to a drilling process, the method 400 may include monitoring a system during a stimulation and/or production period. For example, fluids pumped into the well during drilling and completion may damage the surrounding formation by entering the reservoir rock and blocking pores to the reservoir. In some embodiments, stimulation fluids may dissolve the materials blocking the pores to the reservoir and blocking the flow of formation fluid out of the pores and to the surface. After initial completion of the wellbore, it is common to use concentrated acids (e.g., formic acid, acetic acid, hydrochloric acid, hydrofluoric acid, mixtures thereof, etc.) in an acidizing process to dissolve the materials blocking the pores of the formation and surfactants used in a stimulation phase.

Possible reactions between the stimulation fluid, the formation fluid, the drill string, the casing string, and residual drilling fluid remaining in the formation may be predicted by the computing system 100. With continued reference to FIG. 4, act 406 may include predicting reactions that may take place between stimulation fluids and at least one of the well equipment, cement, the formation, formation fluids, and drilling fluid remaining in the well. Thus, act 406 may include predicting the conditions within the well and predicting the reactions between the drilling fluid and the wellbore equipment, reactions between the stimulation fluid and the wellbore equipment, and reactions between the drilling fluid and the stimulation fluid. For example, the stimulation fluid may react with one of the drill string, the casing within the well, or other material within the well. Act 408 may include adjusting the stimulation fluid (e.g., a composition of the stimulation fluid) to reduce or eliminate undesired predicted reactions that may damage the wellbore equipment. If the computing system 100 predicts substantially harmful reactions between the stimulation fluid and the well, the selection of the stimulation fluid and/or the technical equipment may be adjusted. Act 410 may include determining marker materials for each of the reactions identified in act 406 (e.g., degradation reactions, etc.). Act 414 may include monitoring the fluid leaving the well for the marker materials identified in act 410. In some embodiments, the computing system 100 compares a current sample of the fluid leaving the well to historic data in the memory 120. In other embodiments, the computing system 100 may predict the composition and properties of the fluid exiting the well and compare the predicted properties to the properties of the current sample of fluid exiting the well.

During operation, the fluid produced at the surface may be analyzed as described above to monitor for the marker materials identified in act 410. For example, the detection of a metal ion in the stimulation fluid may be an indication of corrosion caused by a reaction of the stimulation fluid and one of a drill string, metal casing, or other wellbore equipment. Act 416 includes taking appropriate action if a concentration of a marker material in the fluid produced at the surface changes (e.g., increases or decreases). In some embodiments, the processor 110 may send a signal to alter a concentration of a stimulation fluid into the well. In other embodiments, the processor 110 may send a signal to a chemical injection pump to increase a concentration of a corrosion inhibitor or other additive into the well.

Figure 5:
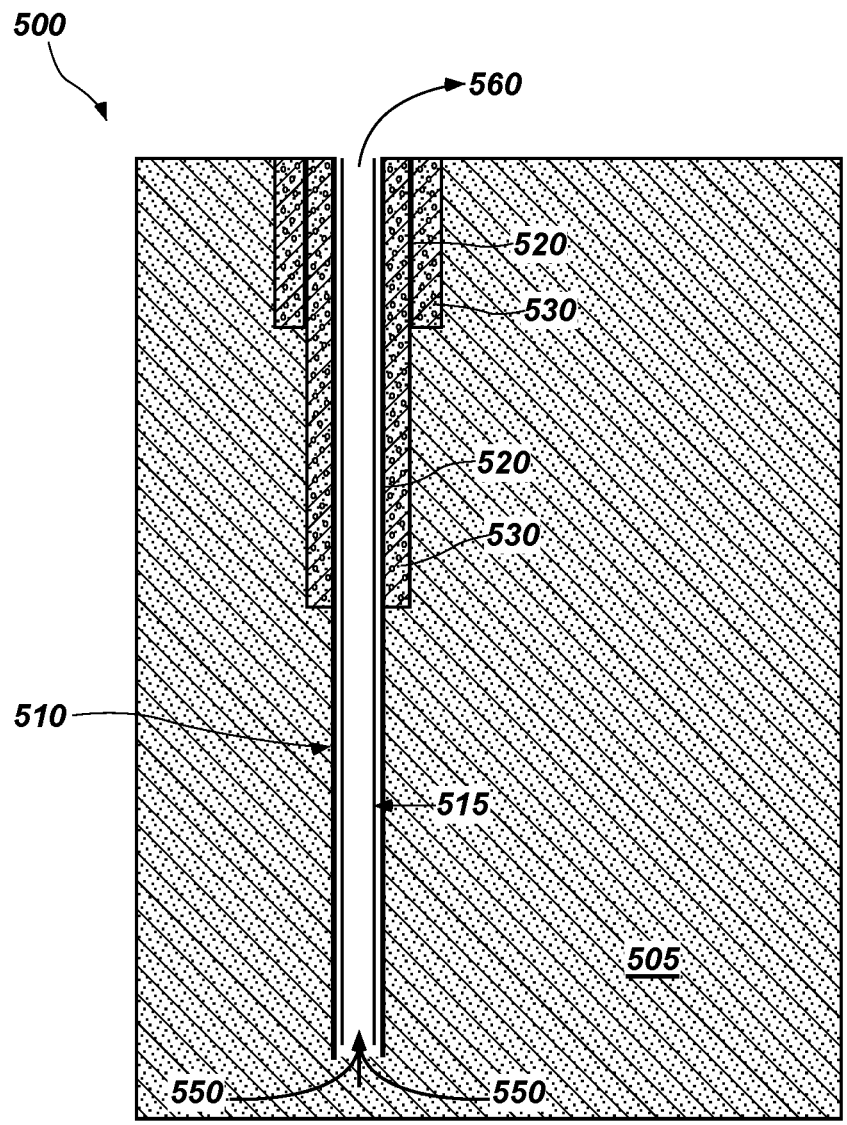
FIG. 5 is a cross-sectional side view showing an intact borehole and differences in the produced fluid due to a decrease in temperature and pressure as the production fluid is brought to the surface.

Referring to FIG. 5, a downhole system 500 includes a production component 510 in a formation 505. The production component 510 may include a metal casing 520. Cement 530 may seal at least a majority of the area of the metal casing 520 from the formation 505. Production component 510 may include a coating 515 on at least one of the exterior and interior of the production component 510. For example, coating 515 may line the interior of a production string. The coating may include materials such as an acrylic coating, an elastomeric coating, an epoxy coating, and combinations thereof. Non-limiting examples of coating 515 include polyvinyl chloride (PVC), polytetrafluoroethylene (PTFE), fluorinated ethylene propylene (FEP), polyvinylidene fluoride (PVDF), and combinations thereof. Formation fluid may flow from stream 550 within the formation 505 to produced fluid 560 at the surface. The composition of the produced fluid 560 may be different than the composition of the formation fluid within the formation 505 due to the changes in temperature and pressure within the formation 505 and the surface and also due to mixing with drilling fluid, stimulation fluid, or completion fluid remaining in the formation 505. For example, as the formation fluid travels to the surface, a portion of the fluid may degas and/or materials may precipitate out of the formation fluid. In some embodiments, the formation fluid may mix with an injected fluid and with any drilling fluid, stimulation fluid, or completion fluid that remains in the formation after such processes are complete.

Figure 6:
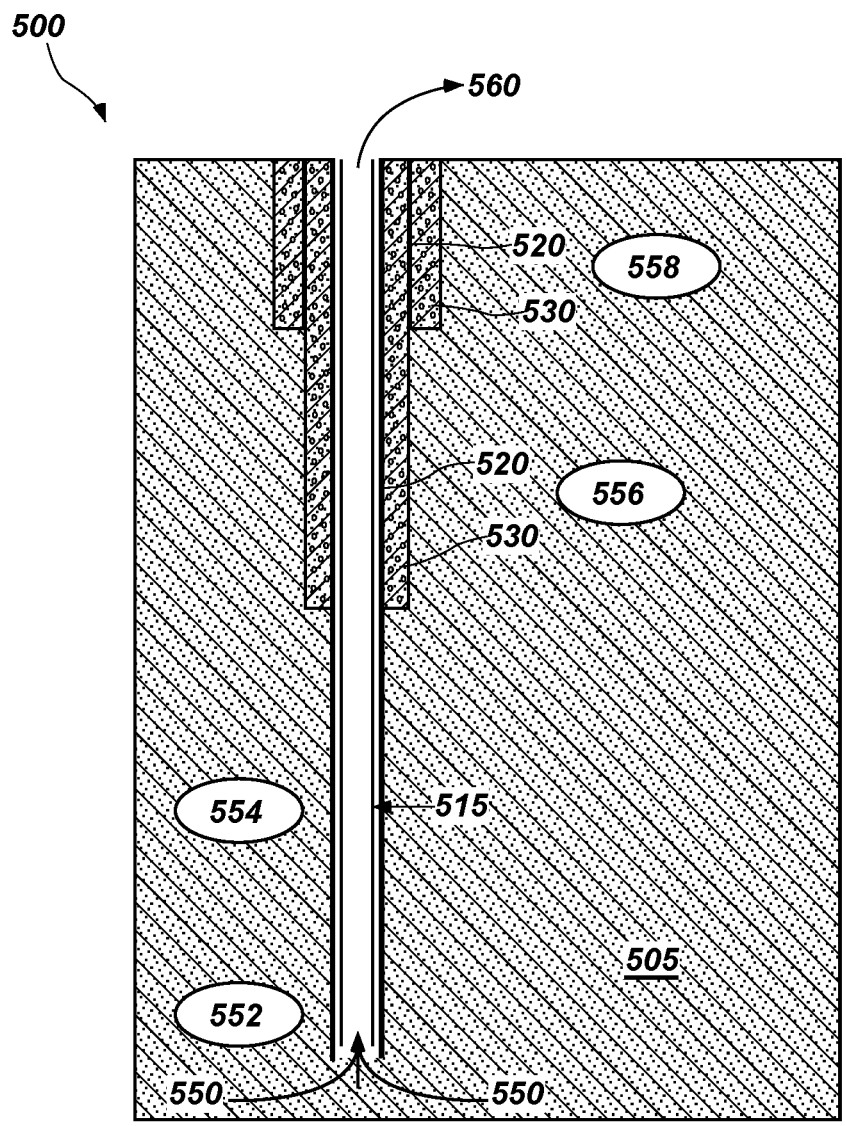
FIG. 6 is a cross-sectional side view showing possible reactions that may take place between fluid and the well as the fluid is brought to the surface in a production process.

FIG. 6 shows downhole system 500 and the various reactions that may take place between the formation fluid and various components of the system 500 as the formation fluid travels from the formation 505 to the surface. Reaction 552 includes a degradation of the coating 515 of the production component 510. Reaction 554 includes corrosion of the production component 510 (FIG. 5) (e.g., production casing). Reaction 556 includes corrosion of casing 520 and reaction 558 includes degradation of cement 530.

Figure 7:
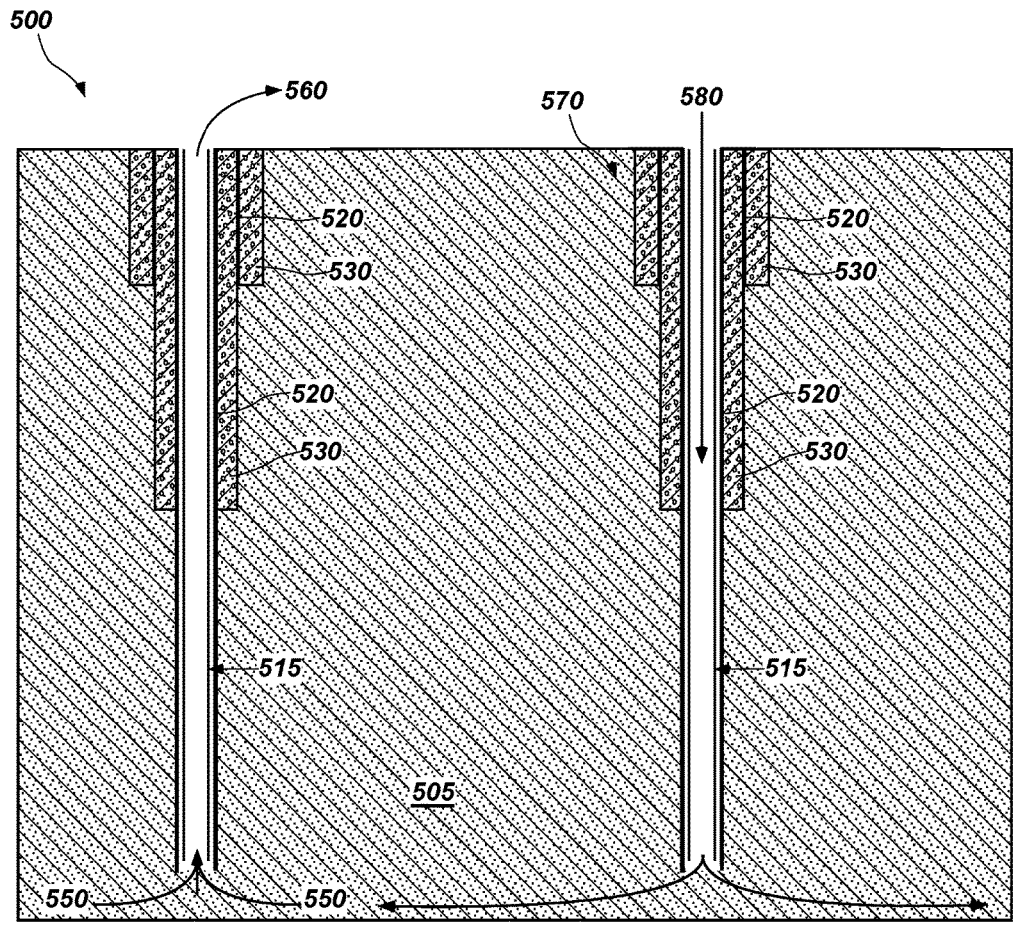
FIG. 7 is a cross-sectional side view showing a production well and a nearby injection well.

Referring to FIG. 7, an injected fluid 580 including one or more chemicals may be injected into the formation 505 through injection well 570. The injected fluid 580 may travel into and distribute in the formation 505 to the production well. The injected fluid 580 may mix with the formation fluid stream 550 and may react with the formation 505 and the formation fluid in the vicinity of the production well. The injected fluid 580 may also react with any residual drilling, stimulation, or completion fluid remaining within the formation 505.

Figure 8:
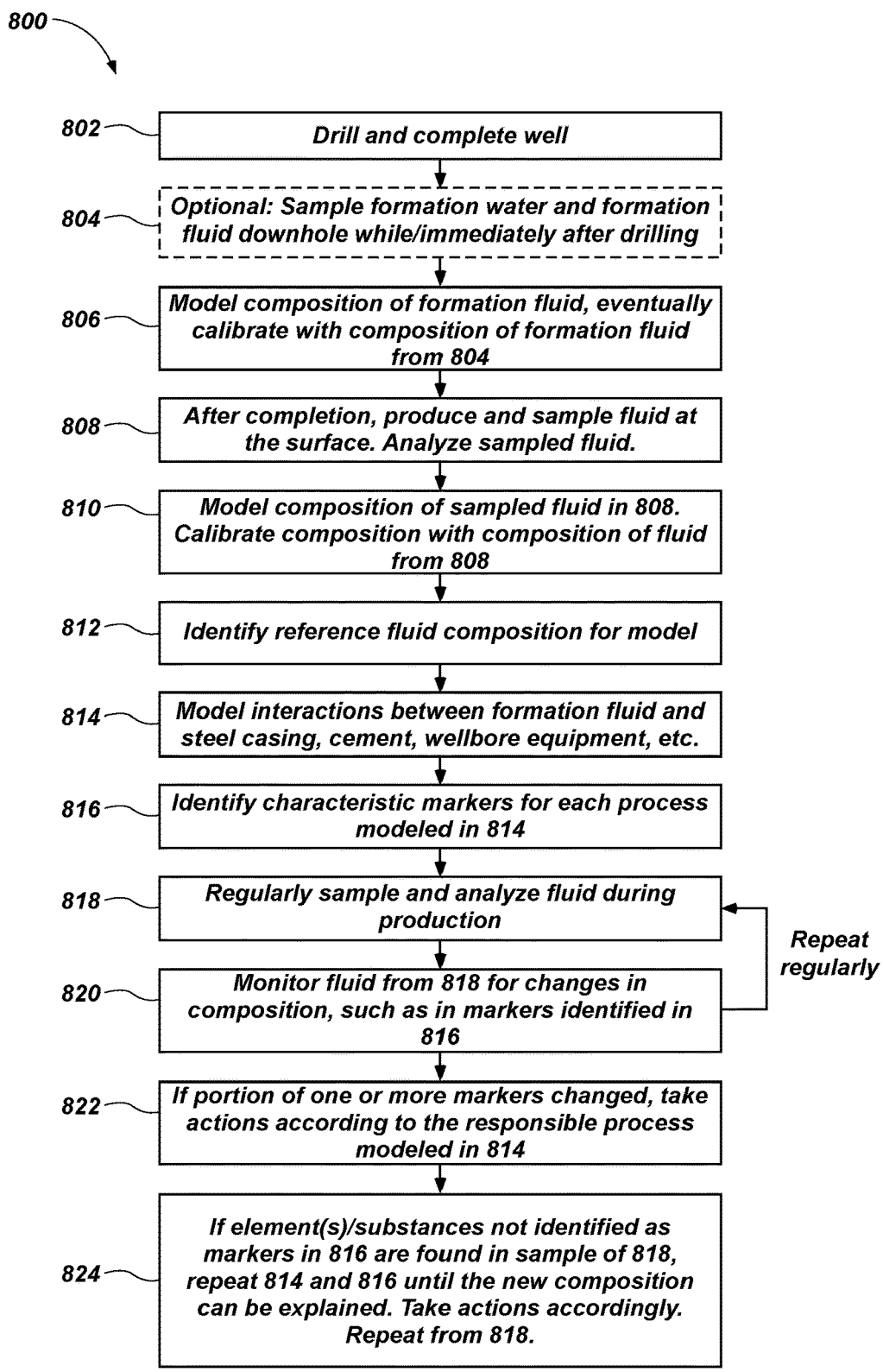
FIG. 8 is a simplified flow diagram showing a process of monitoring the status of the wellbore according to other embodiments of the disclosure.

Referring to FIG. 8 a method 800 of monitoring a condition within the well includes predicting corrosion and degradation of the downhole system 500 (FIG. 5, FIG. 6). The method 800 includes act 802, which includes drilling and completing a well. Act 804 includes an optional act of obtaining and determining a composition of a sample of formation fluid from the well during or soon after drilling of the wellbore. Act 806 includes predicting a composition of the formation fluid using the at least one processor 110, such as with the software of the computing system 100, similar to act 404 described above. In some embodiments, an initial prediction of the composition of the formation fluid may not match the samples analyzed in act 804. The inputs to the at least one processor 110 may be altered to calibrate the predicted composition of the formation fluid to the actual composition obtained and analyzed in act 804.

Act 808 includes producing a sample of the formation fluid at the surface (e.g., a produced fluid) after completion of the well and determining the properties of the produced fluid, such as at least one of the chemical composition, pH, density, viscosity, and electrical conductivity. The composition of the sample may be determined by similar methods described above with reference to act 414 of FIG. 4.

Act 810 includes predicting the composition of the sampled fluid obtained in act 808, with the computing system 100, similar to act 406 described above. The computing system 100 and the memory 120 may be substantially similar to that described above with respect to FIG. 4. The memory 120 may also include information about the formation fluid, such as formation fluid composition, density, viscosity, and pH. The predicted composition may match the composition of the actual sample obtained in act 808. In some embodiments, where the initially predicted composition of the produced fluid does not match the actual composition of the produced fluid, inputs to the computing system 100 may be altered, as described above with reference to act 418 of FIG. 4.

Act 812 includes identifying a reference fluid composition to be used by the computing system 100 (FIG. 1) to predict degradation within the well. The reference fluid composition may be that predicted by the computing system 100 from an assumed starting formation fluid composition, or the reference fluid composition may be that predicted by the computing system 100 after calibrating the inputs to the computing system 100 with a sample of produced fluid at the surface.

Act 814 includes predicting chemical reactions (e.g., reactions 552, 554, 556, and 558) (FIG. 6) that may take place within the well. Non-limiting examples of such reactions include the degradation of coating 515, corrosion of the production component 510, corrosion of the casing 520, or degradation of the cement 530 (FIG. 5, FIG. 6). In some embodiments, the computing system 100 may predict reactions that may take place between the formation fluid and at least one of residual drilling fluid, stimulation fluid, completion fluid, and injected fluid using information about the well, thermodynamic equations, reaction kinetics, and equilibrium equations, as described above with reference to FIG. 4. The computing system 100 may predict how the composition of the produced fluid will change due to reactions that may occur between the formation fluid and the wellbore equipment.

Act 816 includes identifying characteristic markers for each of the reactions predicted in act 814. For example, each of the predicted reactions in act 814 may result in one or more unique marker materials in the produced fluid, such as a change in composition or a change in a property (e.g., pH, density, viscosity, electrical conductivity, etc.) of the produced fluid. The computing system 100 (FIG. 1) may identify one or more unique marker materials for each of the reactions predicted in act 814. The computing system 100 may determine that the one or more markers in a produced fluid is an indication of corrosion or damage within the well. For example, where the formation water includes lithium or strontium, the presence of lithium or strontium in a produced fluid sample may be an early indication that the formation water is mixing into the produced fluid. As another example, degradation of cement lining the wellbore may be detected by a decreased concentration of magnesium, or copper, an increase in pH values, or combinations thereof. Iron corrosion may be detected by reduced sulfate concentrations, increased iron concentrations, increased pH, and combinations thereof. Other marker materials may include ions of copper, chromium, titanium, manganese and nickel in the drilling fluid.

Concentrations of key elements may be monitored by routine sampling of the produced fluid. Act 818 includes regularly sampling and analyzing the produced fluid during production. The samples may be obtained and analyzed at the surface (i.e., outside the wellbore). In other embodiments, the formation fluid may be analyzed by sensors located within the wellbore. The samples may be analyzed at least substantially continuously, or at regular or irregular time intervals.

The composition of the produced fluid may change during or after corrosion or degradation within the downhole environment. For example, the produced fluid at the surface may be contaminated with one or more marker materials identified in act 816 during corrosion or degradation of the well casing, lining, or cement. Act 820 includes monitoring the samples obtained in act 818 for changes in composition and properties, such as for changes in the marker materials. For example, the concentration of marker materials for each of the corrosion or degradation processes identified in act 814 may be monitored for changes. The results of each sample may be recorded and stored in the memory 120 (FIG. 1) to monitor the composition of the produced fluid over time. In some embodiments, the computing system 100 (FIG. 1) compares a current sample of the fluid exiting the well to historic data in the memory 120. In other embodiments, the computing system 100 may predict the composition and properties of the fluid exiting the well and compare the predicted composition and properties to the actual composition and properties of the fluid leaving the well. Act 820 and act 818 may be repeated at least substantially continuously, or at regular or irregular time intervals to monitor the composition of the produced fluid.

Act 822 includes taking a particular action if one or more of the identified markers is present in the sample obtained in act 818. For example, if at least one of the identified markers is detected in the produced fluid, various additives may be added to the system. The computing system 100 (FIG. 1) may suggest taking one or more corrective actions to reduce corrosion. In some embodiments, the computing system 100 may send a signal to a chemical injection pump to increase a concentration of at least one additive to the well. By way of non-limiting example, a decreasing concentration of magnesium or lead and an increase in a pH of the formation fluid may indicate damage to the cement within the wellbore. Corrective actions may include repairing the cement of the wellbore, altering the salinity of a flooding suspension, or adding various additives to the wellbore. If the concentration of a metal ion such as chromium, iron, nickel, magnesium, cobalt, lead, copper, manganese, titanium, etc., increases, one or more corrosion inhibitors, scavengers, additives, or biocides may be added to the wellbore. The fluid exiting the well may be sampled after taking one or more corrective actions. For example, after increasing a concentration of an additive into the well, the concentration of the additive in the fluid exiting the well may be determined. In some embodiments, a concentration of the at least one marker is determined in the fluid exiting the well after taking one or more corrective actions.

Act 824 includes actions that may be taken if the sample obtained in act 818 includes compounds not predicted as marker materials in act 816. In some embodiments, where additional elements or materials are present in the samples of act 818, each of act 814 and act 816 may be repeated until the computing system 100 (FIG. 1) determines the source of the unpredicted material. For example, act 814 may be repeated until the computing system 100 predicts a reaction that explains the presence of the unpredicted material. Thus, the computing system 100 may continuously predict the composition of the fluid exiting the well as information becomes available.

While the disclosure is susceptible to various modifications and alternative forms, specific embodiments have been shown by way of example in the drawings and have been described in detail herein. However, the disclosure is not intended to be limited to the particular forms disclosed. Rather, the disclosure is to cover all modifications, equivalents, and alternatives falling within the scope of the disclosure as defined by the following appended claims and their legal equivalents.

What is claimed is:

1. A method of monitoring degradation of equipment in a wellbore, the method comprising:
    determining at least partially a composition of a fluid exiting a wellbore;
    predicting at least partially a composition of the fluid within the wellbore based, at least in part, on the at least partial composition of the fluid exiting the wellbore;
    after predicting the at least partial composition of the fluid within the wellbore, predicting, with software associated with a processor, at least one reaction between the fluid within the wellbore and at least a component of wellbore equipment using the predicted at least partial composition of the fluid within the wellbore;

identifying at least one property of the fluid exiting the wellbore, wherein the at least one property is indicative of the at least one reaction; and analyzing the fluid exiting the wellbore for the at least one property.

2. The method of claim 1, further comprising selecting the at least one property of the fluid exiting the wellbore to comprise one or more of a concentration of one or more elements, a concentration of one or more ions, a concentration of one or more compounds, a chemical composition, a pH value, a density, a viscosity, a salinity, a redox potential, an electric resistivity, and an electrical conductivity of the fluid exiting the wellbore.

3. The method of claim 1, wherein predicting at least partially a composition of the fluid within the wellbore comprises predicting at least partially the composition of the fluid within the wellbore based on the at least partial composition of the fluid exiting the wellbore and at least one of a temperature and a pressure within the wellbore.

4. The method of claim 1, wherein predicting, with software associated with a processor, at least one reaction between the fluid within the wellbore and at least a component of wellbore equipment comprises predicting a reaction between the fluid within the wellbore and at least one of a drill string, a casing string, a liner string, a coiled tubing, a production tubing, a downhole pump, a valve, and a sensor.

5. The method of claim 1, wherein predicting, with software associated with a processor, at least one reaction between the fluid within the wellbore and at least a component of wellbore equipment comprises predicting a reaction between at least one of $H_2S$, dissolved oxygen, hydrogen, salt, $CO_2$, organic compound, magnesium, cobalt, lead, chromium, titanium, manganese, nickel, iron, and copper in the fluid within the wellbore and the at least a component of wellbore equipment.

6. The method of claim 1, further comprising adjusting a composition of the fluid within the wellbore responsive to predicting the at least one reaction.

7. The method of claim 6, further comprising, after adjusting the composition of the fluid within the wellbore, predicting at least one reaction between the fluid within the wellbore and the at least a component of wellbore equipment based on the adjusted composition of the fluid within the wellbore.

8. The method of claim 6, wherein adjusting a composition of the fluid within the wellbore comprises adding an additive to the fluid within the wellbore.

9. The method of claim 8, further comprising selecting the additive to comprise at least one of magnesium oxide, a viscosifier, a filming amine, lithium, strontium, chromium, iron, nickel, magnesium, cobalt, lead, copper, manganese, titanium, ethylenediaminetetraacetic acid, salt, and a biocide.

10. The method of claim 8, further comprising selecting the additive to comprise at least one of a scavenger, a corrosion inhibitor, a biocide, a scale remover, a viscosifier, and a scaling inhibitor.

11. The method of claim 1, wherein analyzing the fluid exiting the wellbore for the at least one property comprises analyzing the fluid exiting the wellbore for at least one of a concentration of one or more elements, a concentration of one or more ions, a concentration of one or more compounds, a chemical composition, a pH value, a density, a viscosity, a salinity, a redox potential, an electrical resistivity, and an electrical conductivity.

12. The method of claim 1, further comprising providing the at least a component of wellbore equipment with a marker material, wherein analyzing the fluid exiting the wellbore for the at least one property comprises analyzing the fluid exiting the wellbore for a concentration of the marker material.

13. The method of claim 1, further comprising comparing a value of the at least one property of the fluid exiting the wellbore to a historical value of the at least one property of the fluid exiting the wellbore.

14. The method of claim 1, further comprising selecting the at least a component of wellbore equipment to comprise at least one of metallic material, a composite material, a hard metal, an elastomer, polytetrafluoroethylene, polyetheretherketone, and cement.

15. The method of claim 1, wherein at least one of predicting at least partially a composition of a fluid exiting a wellbore and predicting, with software associated with the processor, at least one reaction between the fluid within the wellbore and at least a component of wellbore equipment comprises predicting at least partially a composition of the fluid exiting the wellbore or predicting the at least one reaction between the fluid within the wellbore and the at least a component of wellbore equipment based on at least one of a thermodynamic-based algorithm, a reaction kinetics-based algorithm, and a geochemical-based algorithm.

16. The method of claim 1, wherein predicting, with software associated with a processor, at least one reaction between the fluid within the wellbore and at least a component of wellbore equipment comprises:

predicting at least one reaction between a drilling fluid and the at least a component of wellbore equipment;

predicting at least one reaction between a stimulation fluid and the at least a component of wellbore equipment; and predicting at least one reaction between a formation fluid and the at least a component of wellbore equipment.

17. A method of monitoring degradation of equipment in a wellbore, the method comprising:

determining at least partially a composition of a fluid exiting a wellbore;

predicting at least partially a composition of the fluid within the wellbore based, at least in part, on the at least partial composition of the fluid exiting the wellbore;

predicting a plurality of reactions between the fluid within the wellbore and a component of wellbore equipment at a location within the wellbore;

identifying at least one property of the fluid exiting the wellbore, wherein the at least one property is indicative of at least one reaction of the plurality of reactions; and analyzing the fluid exiting the wellbore for the at least one property that is indicative of the at least one reaction of the plurality of reactions.

18. The method of claim 17, wherein predicting at least partially a composition of the fluid within the wellbore comprises predicting the at least partial composition of the fluid within the wellbore based on the at least partial composition of the fluid exiting the wellbore and at least one of a temperature and a pressure within the wellbore.

19. The method of claim 17, wherein analyzing the fluid exiting the wellbore for the at least one property that is indicative of that at least one reaction of the plurality of reactions comprises analyzing the fluid exiting the wellbore for at least one of:

a concentration of an element;

a concentration of one or more elements;
a concentration of one or more ions;
a concentration of one or more compounds;
a chemical composition;
a salinity;
a redox potential;
a pH value;
a density;
a viscosity;
an electrical resistivity; and
an electrical conductivity.

20. A system for monitoring degradation of equipment in a wellbore, the system comprising:

a computing system, comprising:
 a computer memory configured for storing computing instructions; and
 a processor operably coupled to the computer memory and configured for retrieving the computing instructions from the computer memory and executing the computing instructions to predict at least partially a composition of a fluid within a wellbore based on an at least partial composition of the fluid exiting the wellbore, the processor further configured to predict at least one reaction between the fluid within the wellbore and at least one component of wellbore equipment using the predicted at least partial composition of the fluid within the wellbore and to identify at least one property of the fluid exiting the wellbore, wherein the at least one property is indicative of the at least one reaction; and a sensor operably coupled to the computing system, the sensor located and configured to monitor the at least one property of the fluid exiting the wellbore.

* * * * *